(12) United States Patent
Fukuda et al.

(10) Patent No.: US 11,186,279 B2
(45) Date of Patent: Nov. 30, 2021

(54) CONTROL DEVICE FOR VEHICLE TRAVELLING

(71) Applicant: Toyota Jidosha Kabushiki Kaisha, Toyota (JP)

(72) Inventors: Hiroki Fukuda, Shizuoka-ken (JP); Kenichiro Aoki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 342 days.

(21) Appl. No.: 15/838,871

(22) Filed: Dec. 12, 2017

(65) Prior Publication Data
US 2018/0178796 A1    Jun. 28, 2018

(30) Foreign Application Priority Data

Dec. 27, 2016 (JP) .............................. JP2016-252684

(51) Int. Cl.
*B60W 30/16* (2020.01)
*B60W 30/165* (2020.01)
(Continued)

(52) U.S. Cl.
CPC ........ *B60W 30/162* (2013.01); *B60W 30/025* (2013.01); *B60W 30/12* (2013.01); *B60W 30/16* (2013.01); *B60W 30/165* (2013.01); *B60W 30/18163* (2013.01); *B60W 40/04* (2013.01); *B60K 2310/268* (2013.01);
(Continued)

(58) Field of Classification Search
CPC ........... B60W 2720/106; B60W 30/16; B60W 30/18163; B60W 2720/10; B60W 2750/308; B60W 30/12; B60W 10/04; B60W 10/20; B60W 2420/42;
(Continued)

(56) References Cited

U.S. PATENT DOCUMENTS

| | | | |
|---|---|---|---|
| 6,401,024 B1 * | 6/2002 | Tange ................ | B60K 31/0008 180/170 |
| 2012/0078484 A1 * | 3/2012 | Kato .................... | B60W 30/143 701/96 |

(Continued)

FOREIGN PATENT DOCUMENTS

| | | |
|---|---|---|
| JP | S616035 A | 1/1986 |
| JP | 2000355232 A | 12/2000 |

(Continued)

*Primary Examiner* — Redhwan K Mawari
(74) *Attorney, Agent, or Firm* — Dinsmore & Shohl LLP

(57) ABSTRACT

A control device for vehicle travelling is provided, which executes following control that controls a vehicle speed in accordance with a following distance from a preceding vehicle. The following control includes LK following control that is executed so that a following distance from a preceding vehicle on a travel lane becomes an LK target following distance, under a situation of lane keep. The following control farther includes LC following control that is executed so that a following distance from a vehicle to be a preceding vehicle on a target lane becomes an LC target following distance, under a situation of lane change. In the LC following control, a vehicle speed is controlled so that a larger value is allowed as compared with at a time of execution of the LK following control, with respect to one or both of an acceleration and a jerk.

4 Claims, 6 Drawing Sheets

(51) Int. Cl.
*B60W 40/04* (2006.01)
*B60W 30/02* (2012.01)
*B60W 30/18* (2012.01)
*B60W 30/12* (2020.01)

(52) U.S. Cl.
CPC ............... *B60W 2554/4041* (2020.02); *B60W 2554/804* (2020.02); *B60W 2720/10* (2013.01); *B60W 2720/106* (2013.01); *B60W 2754/30* (2020.02)

(58) Field of Classification Search
CPC ....... B60W 2420/52; B60W 2510/244; B60W 2520/105; B60W 2520/14
See application file for complete search history.

(56) References Cited

U.S. PATENT DOCUMENTS

| | | | |
|---|---|---|---|
| 2016/0071418 A1* | 3/2016 | Oshida | B60W 30/165 701/23 |
| 2016/0091896 A1* | 3/2016 | Maruyama | B60W 50/10 701/23 |
| 2017/0308090 A1* | 10/2017 | Asakura | B60W 30/182 |
| 2017/0336515 A1* | 11/2017 | Hosoya | G01C 21/32 |
| 2018/0093671 A1* | 4/2018 | Allan | G05D 1/0223 |
| 2018/0178796 A1* | 6/2018 | Fukuda | B60W 30/16 |
| 2018/0201270 A1* | 7/2018 | Kang | B62D 15/0255 |
| 2018/0365996 A1* | 12/2018 | Profendiner | G08G 1/096716 |
| 2019/0168757 A1* | 6/2019 | Tokimasa | B60W 30/18163 |
| 2019/0193739 A1* | 6/2019 | Tokimasa | B60K 31/00 |
| 2019/0196487 A1* | 6/2019 | Akiyama | B60W 30/18163 |
| 2019/0310627 A1* | 10/2019 | Halder | B60W 50/14 |
| 2019/0329780 A1* | 10/2019 | Tomescu | B60W 30/09 |
| 2020/0189598 A1* | 6/2020 | Eigel | B60W 30/162 |
| 2020/0241547 A1* | 7/2020 | Hashimoto | B60W 40/04 |
| 2020/0317219 A1* | 10/2020 | Yoshida | B62D 6/00 |

FOREIGN PATENT DOCUMENTS

| | | |
|---|---|---|
| JP | 2003025868 A | 1/2003 |
| JP | 2010158924 A | 7/2010 |
| JP | 2012066758 A | 4/2012 |

* cited by examiner

Initial Condition
· Vehicle Speed : 60km/h
· LC Preceding Vehicle Speed : 90km/h
· LC Preceding Vehicle +ocation : -20m

CONTROL DEVICE FOR VEHICLE TRAVELLING

CROSS-REFERENCE TO RELATED APPLICATIONS

This application claims priority to Japanese Patent Application No. 2016-252684 filed on Dec. 27, 2016, the entire contests of which are hereby incorporated by reference.

BACKGROUND

Field

Embodiments of the present disclosure relates to a control device for vehicle travelling, and particularly relates to a control device for vehicle travelling suitable for causing a vehicle to travel autonomously.

Background Art

Patent Literature 1 listed below discloses a vehicle following a preceding vehicle and traveling autonomously. In the vehicle, a target vehicle speed $V^*$ is calculated based on a detection value L of a following distance and a detection value Vs of a vehicle speed. Further, a target acceleration/deceleration $\alpha^*$ is calculated based on the target vehicle speed $V^*$. A driving force and a braking force are controlled based on the target acceleration/deceleration $\alpha^*$.

In the vehicle, limiting values are imposed on both an acceleration side and a deceleration side, with respect to the target acceleration/deceleration $\alpha^*$. Specifically, the limiting values as follows are imposed in accordance with the vehicle speed Vs.

High Speed Region in which Vs is High

Acceleration limiting value $\alpha U$ which allows a sudden acceleration

Deceleration limiting value $\alpha D$ which does not allow sudden deceleration

Low Speed Region in which Vs is Low

Acceleration limiting value $\alpha U$ which does not allow sudden acceleration

Deceleration limiting value $\alpha D$ which allows a sudden deceleration

According to the acceleration limiting value $\alpha U$ as above, favorable acceleration performance can be realized in the high speed region without generating an excessive acceleration in an urban area in which low-speed travel is mainly performed. Further, according to the above described deceleration limiting value $\alpha D$, excessive braking can be prevented from being performed in the high speed region while a sufficient stop ability is ensured during travel in an urban area. Consequently, according to the above described conventional vehicle, appropriate vehicle behaviors can be realized in both the high speed region such as a highway and a low speed region such as an urban area.

List of Related Art

Following is a list of patent literatures which the applicant has noticed as related arts of the present disclosure.
Patent Literature 1: JP 2000-355232 A

SUMMARY

Autonomous travelling of a vehicle involves a lane change. In the mode in which a vehicle follows a preceding vehicle, a preceding vehicle on the same lane is an object to be followed under a situation of lane keep. Further, under a situation of lane change, a vehicle to be a preceding vehicle on a lane to which the vehicle intends to move is an object to be followed.

Under the situation of lane keep, there is a low necessity to make the following distance from the preceding vehicle to coincide with the target following distance in haste. On the other hand, in order to keep comfortable riding, it is desirable not to generate a rapid acceleration. Consequently, under the situation of lane keep, it is desirable to suppress the acceleration of the vehicle to be small, rather than to change the vehicle speed quickly.

On the other hand, under the situation of lane change, it may happen that lane change cannot be properly completed unless the following distance from the vehicle on the target lane can be adjusted quickly. Consequently, under the situation of lane change, there is a high necessity to generate a large acceleration as compared with under the situation of lane keep.

In Patent Literature 1, on calculating tire acceleration limiting value $\alpha U$ and the deceleration limiting value $\alpha D$, the situation of lane keep and the situation of lane change are not distinguished. Consequently, in the vehicle described in Patent Literature 1, it may happen that an excessive acceleration is allowed under the situation of lane keep, and a favorable ride comfort cannot be ensured. Alternatively, in the vehicle, it may happen that a sufficient acceleration cannot be ensured under the situation where lane change is requested, and a chance of lane change cannot be used sufficiently.

Embodiments of the present disclosure have been made to solve the problems as described above, and an object of the embodiments are to provide a control device for vehicle travelling that causes a vehicle to travel autonomously, realizes a favorable ride comfort under a situation of lane keep, and completes lane change with a high probability.

To achieve the above mentioned purpose, a first aspect of an embodiment of the present disclosure is a control device for vehicle travelling that executes following control that controls a vehicle speed in accordance with a following distance from a preceding vehicle, wherein the following control includes LK following control that is executed so that a following distance from a preceding vehicle on a travel lane becomes an LK target following distance, under a situation of lane keep, and LC following control that is executed so that a following distance from a vehicle to be a preceding vehicle on a target lane becomes an LC target following distance, under a situation of lane change, and in the LC following control, a larger value is allowed as compared with at a time of execution of the LK following control, with respect to at least one of an acceleration and a jerk.

A second aspect of an embodiment of the present disclosure is the control device for vehicle travelling according to the first aspect discussed above, wherein the LK following control includes processing of calculating an LK target vehicle speed so that the following distance from the preceding vehicle on the travel lane comes close to the LK target following distance with an LK following time constant, and processing for realizing the LK target vehicle speed, the LC following control includes processing of calculating an LC target vehicle speed so that the following distance from the vehicle to be foe preceding vehicle on the target lane comes close to the LC target following distance with an LC following time constant, and processing for realizing the LC target vehicle speed, and the LK following time constant has a larger value than the LC following time constant.

A third aspect of an embodiment of the present disclosure is the control device for vehicle travelling according to the second aspect discussed above, wherein the LK following control includes processing of calculating an LK target acceleration based on the LK target following distance, and processing of calculating the LK target vehicle speed based on the LK target acceleration, and the LC following control includes processing of calculating an LC target acceleration based on the LC target following distance, and processing of calculating the LC target vehicle speed based on the LC target acceleration.

A fourth aspect of an embodiment of the present disclosure is the control device for vehicle travelling according to the first aspect discussed above, wherein the LK following control includes processing of calculating an LK target acceleration based on the LK target following distance, processing of guarding an upper limit value of the LK target acceleration to an LK acceleration allowable value, processing of calculating an LK target vehicle speed based on the LK target acceleration after being guarded, and processing for realizing the LK target vehicle speed, the LC following control includes processing of calculating an LC target acceleration based on the LC target following distance, processing of guarding an upper limit value of the LC target acceleration to an LC acceleration allowable value, processing of calculating an LC target vehicle speed based on the LC target acceleration after being guarded, and processing for realizing the LC target vehicle speed, and the LK acceleration allowable value is a smaller value as compared with the LC acceleration allowable value.

A fifth aspect of an embodiment of the present disclosure is the control device for vehicle travelling according to the first aspect discussed above, wherein the LK following control includes processing of calculating an LK target acceleration based on the LK target following distance, processing of guarding the LK target acceleration so that an upper limit value of a jerk becomes an LK jerk allowable value, processing of calculating an LK target vehicle speed based on the LK target acceleration after being guarded, and processing for realizing the LK target, vehicle speed, the LC following control includes processing of calculating an LC target acceleration based on the LC target following distance, processing of guarding the LC target acceleration so that an upper limit value of a jerk becomes an LC jerk allowable value, processing of calculating an LC target vehicle speed based on the LC target acceleration after being guarded, and processing for realizing the LC target vehicle speed, and the LK jerk allowable value is a smaller value as compared with the LC jerk allowable value.

A sixth aspect of an embodiment of the present disclosure is the control device for vehicle travelling according to the first aspect discussed above, wherein the following control includes double following control that is executed with both of a preceding vehicle on a travel lane and a vehicle to be a preceding vehicle on a target lane set as objects to fee followed, in a period until the LC following control is started after implementation of lane change is determined, and the double following control includes processing of calculating an LK target acceleration based on the LK target following distance, processing of calculating an LC target acceleration based on the LC target following distance, processing of selecting smaller one of the LK target acceleration and the LC target acceleration as a target acceleration, processing of calculating a target vehicle speed based on the selected target acceleration, and processing for realizing the target vehicle speed.

A seventh aspect of an embodiment of the present disclosure is the control device for vehicle travelling according to the first aspect discussed above, further comprising:

an object recognition sensor which detects a distance from a nearby other vehicle including said preceding vehicle; and an electronic control unit which performs the processing for said following control while using the output of said object recognition sensor, wherein said electronic control unit further performs:

processing for judging of implementation of lane keep under a situation in which lane keep condition is satisfied; and processing for judging of implementation of lane change under a situation in which lane change condition is satisfied.

Advantages of Embodiments of the Present Disclosure

According to the first aspect discussed above, at the time of the LK following control based on lane keep, it is possible to sufficiently suppress the acceleration and the jerk. Further, at the time of the LC following control based on lane change, it is possible to allow a vehicle speed change quickly. Consequently, according to the following control of the embodiment of the present disclosure, it is possible to make a lane change successful with a high probability, while providing an excellent ride comfort, under the situation of lane keep.

According to the second aspect discussed above, by setting the LK following time constant and the LC following time constant at different values, it becomes possible to bring the following distance close to the target following distance more rapidly at the time of lane change, as compared with at the time of lane keep. As a result, according to the embodiment of the present disclosure, it is possible to realize an excellent ride comfort under the situation of lane keep, and obtain success with a high probability at the time of lane change.

According to the third aspect discussed above, in the LK following control, it is possible to calculate the LK target speed from the LK target following distance via the LK target acceleration. Further, in the LC following control, it is possible to calculate the LC target speed from the LC target following distance via the LC target acceleration.

According to the fourth aspect discussed above, at the time of lane keep, the LK acceleration allowable value is a small value, so that the acceleration that is allowed is sufficiently suppressed. On the other hand, at the time of lane change, the LC acceleration allowable value is a large value, so that a sufficiently large acceleration is allowed. Consequently, according to the embodiment of the present disclosure, it is possible to realize an excellent ride comfort under the situation of lane keep, and obtain success with a high probability at the time of lane change.

According to the fifth aspect discussed above, at the time of lane keep, the LK jerk allowable value is a small value, so that the jerk that is allowed is sufficiently suppressed. On the other hand, at the time of lane change, the LC jerk allowable value is a large value, so that a sufficiently large jerk is allowed. Consequently, according to the embodiment of the present disclosure, it is possible to realize an excellent ride comfort under the situation of lane keep, and obtain success with a high probability at the time of lane change.

According to the sixth aspect discussed above, by executing the double following control in the period until the LC following control is started after implementation of lane change is determined, it becomes possible to determine the target vehicle speed while considering the relationship between both of the preceding vehicle on the travel lane, and the vehicle on the target lane. Further, it is possible to calculate the target vehicle speed based on smaller one of the LK target acceleration and the LC target acceleration. Consequently, according to the embodiment of the present disclosure, it is possible to avoid occurrence of excessive approach, with respect to both of the preceding vehicle on the travel lane and the vehicle on the target lane in a transitional period from lane keep to lane change.

DETAILED DESCRIPTION

First Embodiment

Hardware Configuration of First Embodiment

Figure 1:
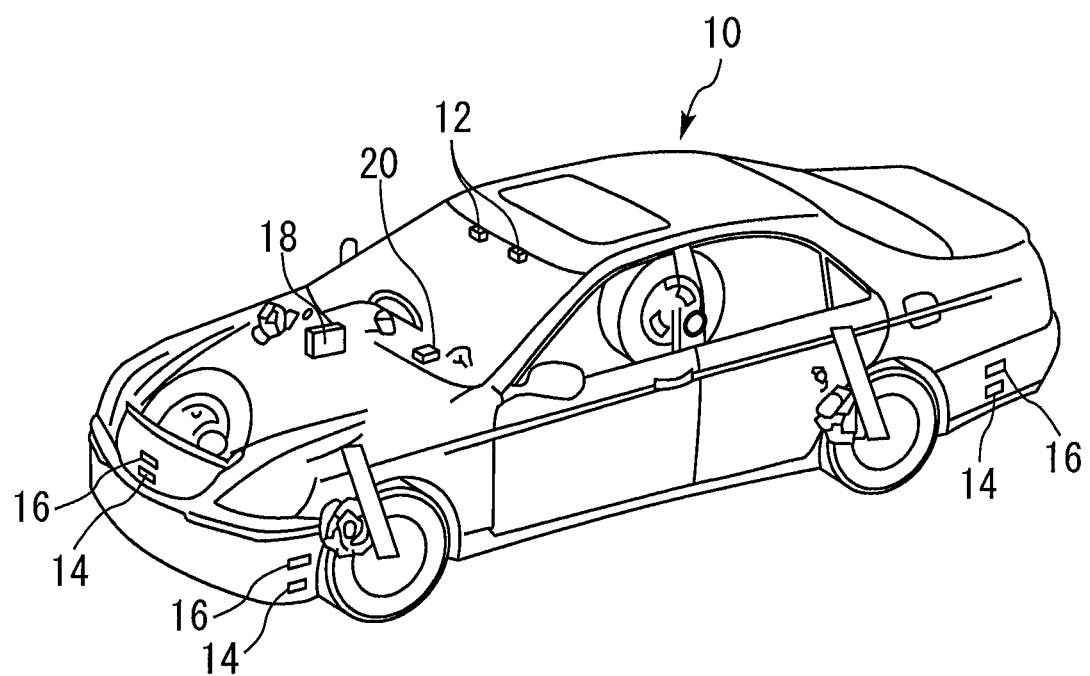
FIG. 1 illustrates a hardware configuration of a first embodiment of the present disclosure.

FIG. 1 illustrates a hardware configuration of an autonomous driving vehicle 10 equipped with a control device for vehicle travelling according to a first embodiment of the present disclosure. As illustrated in FIG. 1, the vehicle 10 is equipped with a stereo camera 12. The stereo camera 12 can pick up a stereoscopic image of a front of the vehicle 10 at a predetermined viewing angle. It is also possible to replace the stereo camera 12 with a monocular camera.

Further, a plurality of LIDAR (Laser Imaging Detection and Ranging) units 14 are mounted on the vehicle 10 in such a manner as to surround the vehicle. More specifically, six of the LIDAR units 14 in total are mounted so that, a region in front of the vehicle, left and right regions in front of the vehicle, a region behind the vehicle, left and right regions behind the vehicle are to be detection regions. According to the LIDAR units 14, outlines of and distances to the objects present in the respective detection regions can be detected.

Furthermore, a plurality of millimeter wave radar units 16 are mounted on the vehicle 10 so as to surround the vehicle. Five of the millimeter wave radar units 16 in total are mounted so that the region in front of the vehicle, the left and right regions in front of the vehicle, and the left and right regions behind the vehicle are detection ranges. According to the millimeter wave radar units 16, distances to objects present in the respective detection regions, and relative speeds of the objects and the vehicle 10 can be detected. Hereunder, the stereo camera 12, the LIDAR units 14 and the millimeter wave radar units 16 described above are collectively referred to as "object recognition sensors".

The vehicle 10 is equipped with an ECU (Electronic Control Unit) 18. Detection signals of the aforementioned "object recognition sensors" are supplied to the ECU 18. Based on the detection signals, the ECU 18 can detect white lines on a road surface or the like, which expresses lanes, nearby other vehicles, traffic control signs, pylons placed in a construction site, and the like.

The vehicle 10 is also equipped with a GPS (Global Positioning System) unit 20. The GPS unit 20 can detect a present position of the vehicle 10 by using a GPS. An output signal of the GPS unit 20 is supplied to the ECU 18. Map data is stored in the ECU 18. The ECU 18 can determine a present position of the vehicle 10 on a map, based on the signal sent from the GPS unit 20 and the map data.

Further, various actuators included in the driving system of the vehicle 10, various actuators included in a braking system, a steering motor and the like are electrically connected to the ECU 18 (none of them is illustrated). The ECU 18 can control acceleration, deceleration and steering of the vehicle 10 by issuing instructions to the actuators.

Following Control in Autonomous Drive

In the present embodiment, the ECU 18 can execute autonomous driving control for causing the vehicle 10 to travel autonomously. The autonomous driving control includes following control for the vehicle 10 to follow a preceding vehicle. Further, the following control includes LK following control, LC following control and double following control.

The LK following control is performed under a situation where the vehicle 10 is requested to keep to the lane (Lane Keep). In the LK following control, a preceding vehicle (hereunder, referred to as an "LK preceding vehicle") on a travel lane of the vehicle 10 is an object to be followed, and a vehicle speed is controlled so that a following distance from the LK preceding vehicle becomes an LK target following distance. The LK target following distance is a target following distance between the vehicle 10 and the LK preceding vehicle under a case of lane keeping.

The LC following control is performed under a situation where the vehicle 10 is requested to change lane (Lane Change). In the LC following control, a vehicle to be a preceding vehicle on a lane to which the vehicle 10 intends to move is an object to be followed. Hereunder, the vehicle is referred to as an "LC preceding vehicle". Under the LC following control, a vehicle speed is controlled so that a following distance from the LC preceding vehicle becomes an LC target following distance. The LC target following distance is a target following distance between the vehicle 10 and the LC preceding vehicle under a situation of lane changing.

The double following control is executed in a period until steering is actually started after start of autonomous lane change is determined in the vehicle 10. The ECU 18 can determine the start of autonomous lane change at its own discretion. Further, the ECU 18 can determine the start of autonomous lane change by receiving an instruction from the driver. Furthermore, the ECU 18 can propose implementation of lane change to the driver, and can determine start of lane change when the driver approves the proposal. In any case, the ECU 18 flashes a direction indicator after determining the start of lane change, notifies the driver of the start of lane change, and starts actual steering after checking safety of surroundings. In this time period, it is necessary to control both the following distance from the LK preceding vehicle and the following distance from the LC preceding vehicle to appropriate values. The double following control is performed to achieve a purpose like this.

Figure 2:
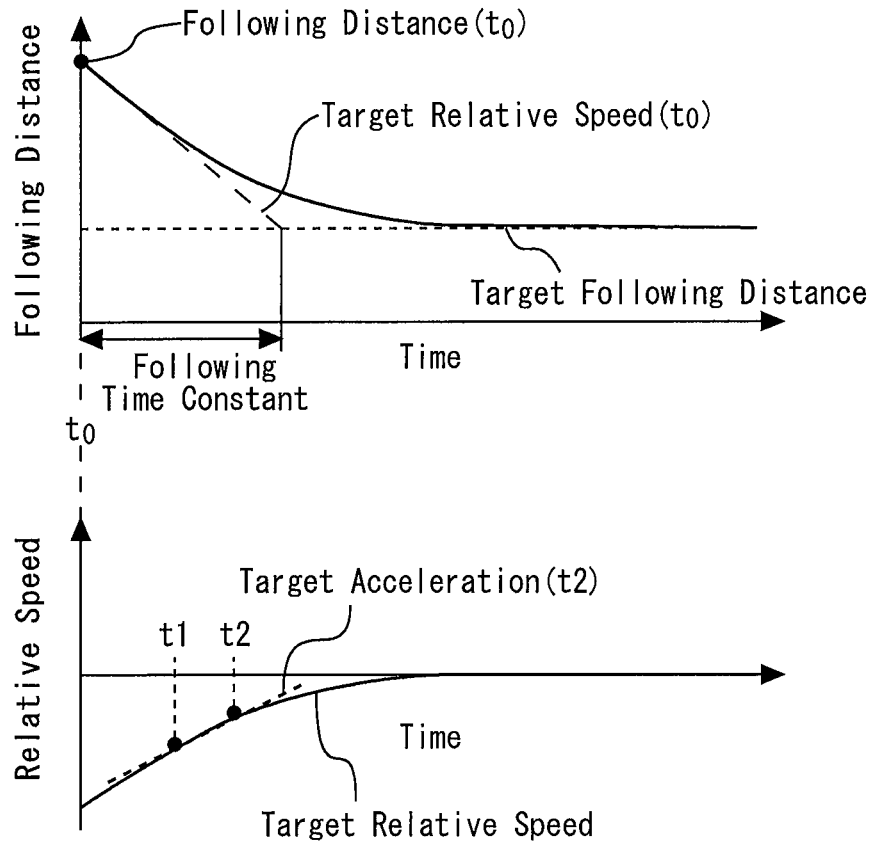
FIG. 2 is a diagram for explaining a method for the ECU shown in FIG. 1 calculating a target speed of a vehicle based on a following distance from a preceding vehicle.

FIG. 2 is a diagram for explaining a method for the ECU 18 calculating a target speed of the vehicle 10 based on a following distance from a preceding vehicle, when the ECU 18 carries out the aforementioned following control. In an upper tier in FIG. 2, "following distance (t0)" represents a following distance between the vehicle 10 and the preceding vehicle at a time point t0. FIG. 2 shows that a longer following distance than "target following distance" occurs at the time point t0. The target following distance has a fixed value that is set in advance for each of the LC following control and the LK following control.

The "target relative speed (t0)" shown by a broken line in the upper tier in FIG. 2 represents a gradient of a target relative speed that is set by the ECU 18 based on the following distance (t0) at the time point t0. The target relative speed is, concretely, a length of a distance that should be corrected per unit time, and is calculated by expression (1) as follows.

(target relative speed)=(following distance−target following distance)/(following time constant)   (1)

For example, when the following distance (t0) at the time point t0 is 30 m, the target following distance is 10 m, and the following time constant is 5 sec, (target relative speed) =−(30−10)/5=−4 m/s. Here, the "following time constant" is a fixed value corresponding to a time period during which a present following distance is caused to coincide with the target following distance.

The ECU 18 sets a target relative speed (ti) based on a following distance (ti) at a time point of each calculation period. Since the following time constant has a fixed value, an absolute value of the target relative speed (ti) becomes smaller as the following distance (ti) is closer to the target following distance. And, the smaller the absolute value of the target relative speed (ti) is, the smaller a distance by which the following distance comes close to the target following distance in one calculation operation period becomes. As a result, the following distance (ti) comes close to the target following distance along a waveform as shown by a solid line in the upper tier in FIG. 2.

A lower tier in FIG. 2 shows a method for the ECU 18 calculating a target acceleration based on a target, relative speed. Specifically, the ECU 18 calculates the target acceleration by expression (2) as follows.

(target acceleration)=(target relative speed−target relative speed previous value)/(calculation operation period)   (2)

For example, when a target relative speed (t1) at a time point t1 is −4 m/s, a target relative speed (t2) at a time point t2 is −3 m/s, and the calculation operation period is 1 sec, a target acceleration (t2) at the time point (t2) is calculated as in the following expression, target acceleration (t2)=(−3−(−4))/1=1 m/s2.

The ECU 18 calculates a target vehicle speed by applying the target acceleration calculated in the way above to expression (3) as follows.

(target vehicle speed)=(target vehicle speed previous value)+(target acceleration)*(calculation operation period)   (3)

The target vehicle speed previous value is a target vehicle speed calculated in a previous processing cycle. At a time of start of the following control, a speed of the vehicle 10 at the time is set as an initial value of the target vehicle speed previous value. For example, when the target vehicle speed at the time point t1 is 28 m/s, and the target acceleration of 1 m/s2 is requested at the time point t2, the target vehicle speed (t2) is calculated as 29 m/s at the time point t2.

Figure 3:
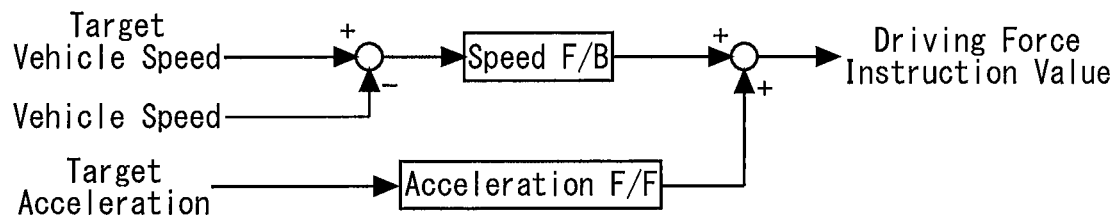
FIG. 3 is a control block diagram for explaining a method by which the ECU shown in FIG. 1 generates a driving force instruction value.

FIG. 3 is a control block diagram for explaining a method for generating a driving force instruction value in the vehicle 10. The ECU 18 calculates the driving force instruction value in accordance with a logic illustrated, in FIG. 3. Here, specifically, feedback control for causing the actual vehicle speed to coincide with a target vehicle speed, and feedforward control for realizing a target acceleration are performed in combination. The driving force instruction value calculated in this way is given to a driving system such as an engine or a motor. Further, the driving force instruction value may be calculated as a value for requesting braking of the vehicle 10. In the case like this, the driving force instruction value is given to a braking device. As a result, in the vehicle, the driving force and the braking force are controlled so that the target vehicle speed and the target acceleration are realized.

Influence of the Following Time Constant

Figure 4:
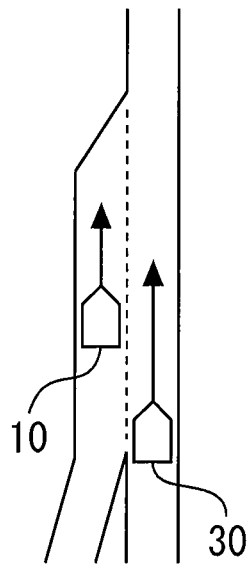
FIG. 4 illustrates a scene in which the vehicle 10 shown in FIG. 1 travels on a mergence lane.

FIG. 4 illustrates a scene in which the vehicle 10 is autonomously travelling on a mergence lane to join a main lane. On the main lane, a nearby other vehicle 30 is present at a right rear side of the vehicle 10. In this case, the LC following control will be performed in the vehicle 10 because lane change is necessary. Hereunder, the nearby other vehicle 30 will be referred to as the LC preceding vehicle 30. Conditions of this scene are assumed to be as follows.

Speed of the vehicle 10: 60 km/h
Speed of the LC preceding vehicle 30: 90 km/h
Position of the LC preceding vehicle 30: −20 m In the scene illustrated in FIG. 4, the ECU 18 performs LC following control so as to bring the following distance close to the LC target following distance after entering the main lane behind the LC preceding vehicle 30. Here, it is assumed that the LC target following distance is 10 m.

Figure 5:
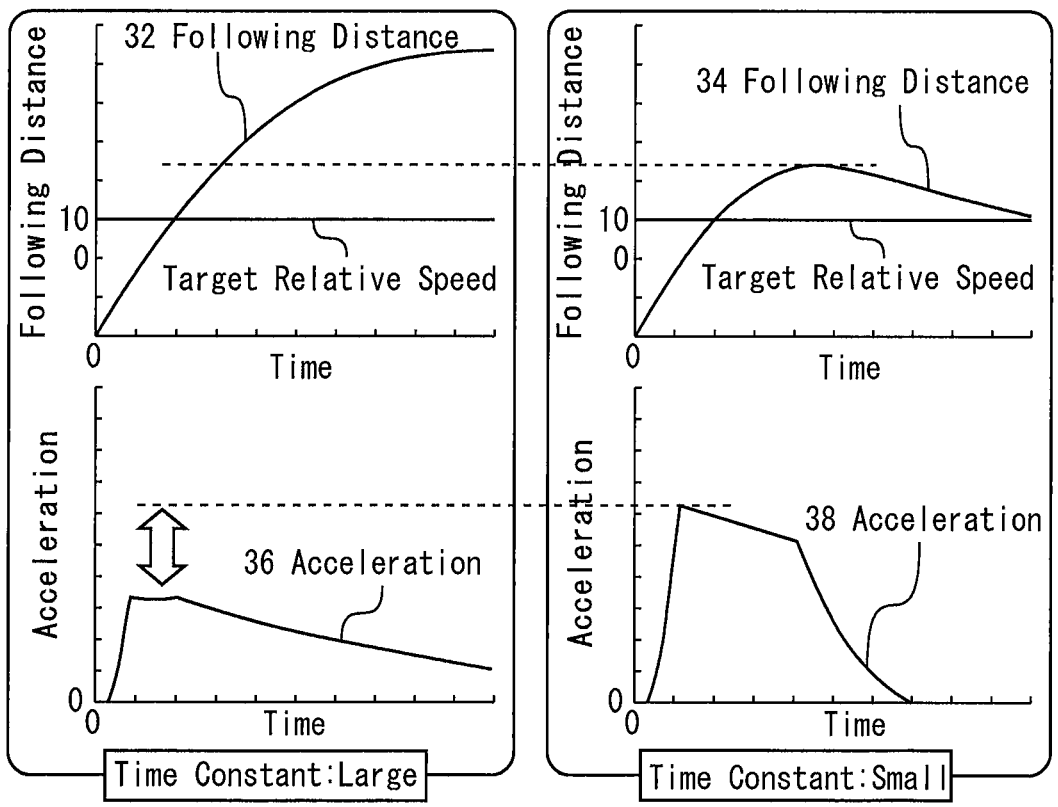
FIG. 5 shows a relation between a vehicle movement and a value of a following time constant used in a calculation of a target vehicle speed.

A waveform in the case of a large value being used as the following time constant is shown inside a frame shown at a left side in FIG. 5. Specifically, a change over time of the following distance is shown in an upper tier in the frame, and a change over time of the acceleration is shown in a lower tier in the frame. On the other hand, a waveform in the case of a small value being used as the following time constant is shown inside a frame shown at a right side in FIG. 5. Similarly to the inside of the frame at the left side, a change over time of the following distance is shown in an upper tier, and a change over time of the acceleration is shown in a lower tier, respectively.

A following time constant corresponds to "a time period during which the present following distance is caused to coincide with the target following distance", as described above. Accordingly, as the following time constant is larger, the time period during which the following distance converges onto the target following distance becomes longer. A difference in convergence time period appears in a waveform 32 of the following distance in the upper tier in the left frame in FIG. 5 and a waveform 34 of the following distance in the upper tier in the right frame in FIG. 5.

Further, the fact that "the time period during which the present following distance coincides with the target following distance is long" can be rephrased as "a distance by which the following distance comes close to the target following distance during one calculation operation period is short", that is. "a change that occurs to a difference between the following distance and the target following distance (following distance-target following distance) in one calculation operation period is small". As shown in expression (1) described, above, an absolute value of the target relative speed is a value obtained by dividing the difference by the following time constant. Accordingly, as the change which occurs to the difference is smaller, the difference that occurs to the target relative speed in one calculation operation period also becomes smaller. According to expression (2) described above, as the difference which occurs to the target relative speed in one calculation operation period is smaller, the target acceleration has a smaller value. Consequently, the acceleration that occurs to the vehicle 10 becomes smaller as the following time constant becomes larger. A difference in convergence time period appears in a waveform 36 of the acceleration shown in a lower tier in the left frame in FIG. 5, and a waveform 38 of the acceleration shown in a lower tier in the right frame in FIG. 5.

As described above, a behavior shown by the vehicle 10 at the time of the following control changes in accordance with a value of the following time constant. Specifically, as the following time constant is larger, an upper limit value of the acceleration that occurs while the following distance is adjusted becomes smaller, and a time period required for convergence of the following distance becomes larger. Further, as the following constant is smaller, the upper limit value of the acceleration that occurs during adjustment of the following distance becomes a larger value, and the time period required for convergence of the following distance becomes shorter.

Feature of First Embodiment

Figure 6:
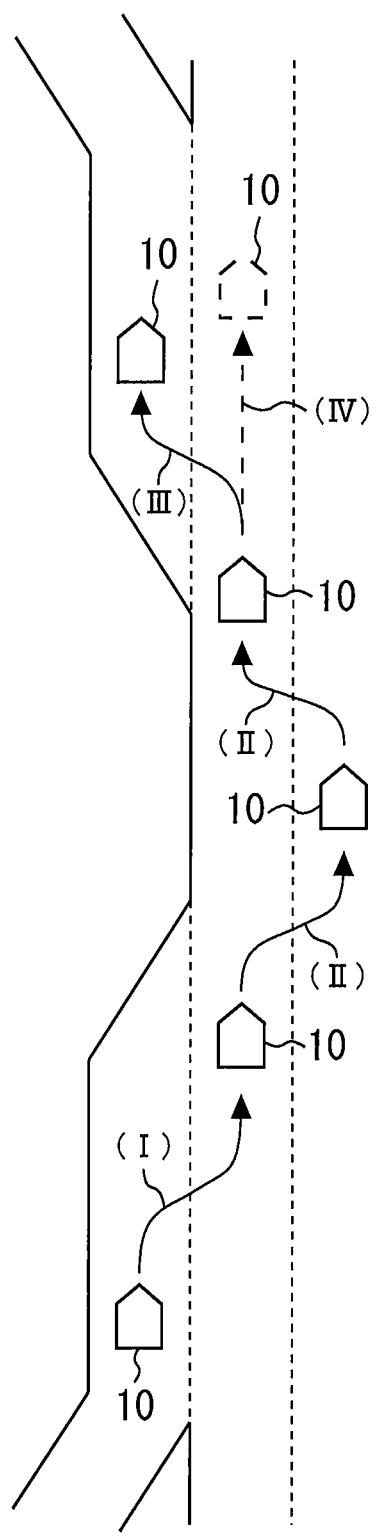
FIG. 6 is a diagram for explaining a scene which the vehicle is likely to encounter to while traveling.

FIG. 6 is a diagram for explaining a scene in which the vehicle 10 under the following control is likely to encounter. An arrow shown by being assigned with a reference sign (I) shows "mergence" into a main lane from a mergence lane. An arrow with (II) shows "lane change" in main lanes. Further, an arrow shown by being assigned with (III) shows "branch" to a branch lane from the main lane. An arrow (IV) shows a state of lane keep.

Hereunder, features required of a behavior of the vehicle 10 in the respective scene will be described.

(I) Mergence

In the scene of mergence, there may arise a necessity to perform lane change in such a manner as to break in between vehicles traveling on the main lane. In this case, the vehicle 10 is requested to cause a following distance from the LC preceding vehicle to converge to the target following distance quickly so as not to hinder travel of a following vehicle on the main lane. Consequently, in the scene of mergence, it is necessary to allow the vehicle 10 to have a large acceleration and deceleration. From this point of view, it is desirable that the following time constant used in the LC following control at the time of mergence is set at a small value.

(II) Lane Change in Main Lane

In the scene of lane change on the main lane, the vehicle 10 may be requested to break in between the vehicles traveling on the lane to which the vehicle intends to move. In this case, it is necessary to allow the vehicle 10 to have a large acceleration and deceleration as in the case of mergence. Consequently, in the LC following control at the time of lane change on the main lane, it is also desirable that the following time constant is set at a small value. However, a relative speed that occurs to between the vehicle 10 and the LC preceding vehicle at the time of lane change on the main lane is normally smaller as compared with a relative speed at the time of mergence. Consequently, the following time constant in this scene may be at a larger value than the following time constant at the time of mergence.

(III) Branch

In the scene of branch, after moving onto the branch lane, it is necessary to keep the following distance from the LC preceding vehicle appropriate but it is not necessary to conscious so much that the vehicle interferes with travel of a following vehicle. In addition, since the LC preceding vehicle on the branch lane is a vehicle branched from the main lane similarly to the vehicle 10, a large relative speed does not occur to between both the vehicles. Under the situation like this, because a large acceleration and deceleration are not required, it is desirable that the following time constant is set at a larger value as compared with the value at the time of lane change on the main lane, with a priority given to a ride comfort of the vehicle 10.

(IV) Lane Keep

In the scene of lane keep, the relative speed to the LK preceding vehicle on the travel lane is not very large in general. In addition, unlike the scene of mergence and lane change, the vehicle 10 is not requested to cutting in between vehicles. Further, in the case of branch, a vehicle speed of the LC preceding vehicle that has moved to the branch lane may change greatly, but in the scene of lane keep, the vehicle speed of the LK preceding vehicle does not change rapidly in general. Consequently, in the scene of lane keep, the acceleration and the deceleration requested of the vehicle 10 are further smaller as compared with at the time of branch. Consequently, in the scene, it is desirable to set the following time constant at a smaller value than the value at the time of branch, with a priority given to the ride comfort of the vehicle 10.

Figure 7:
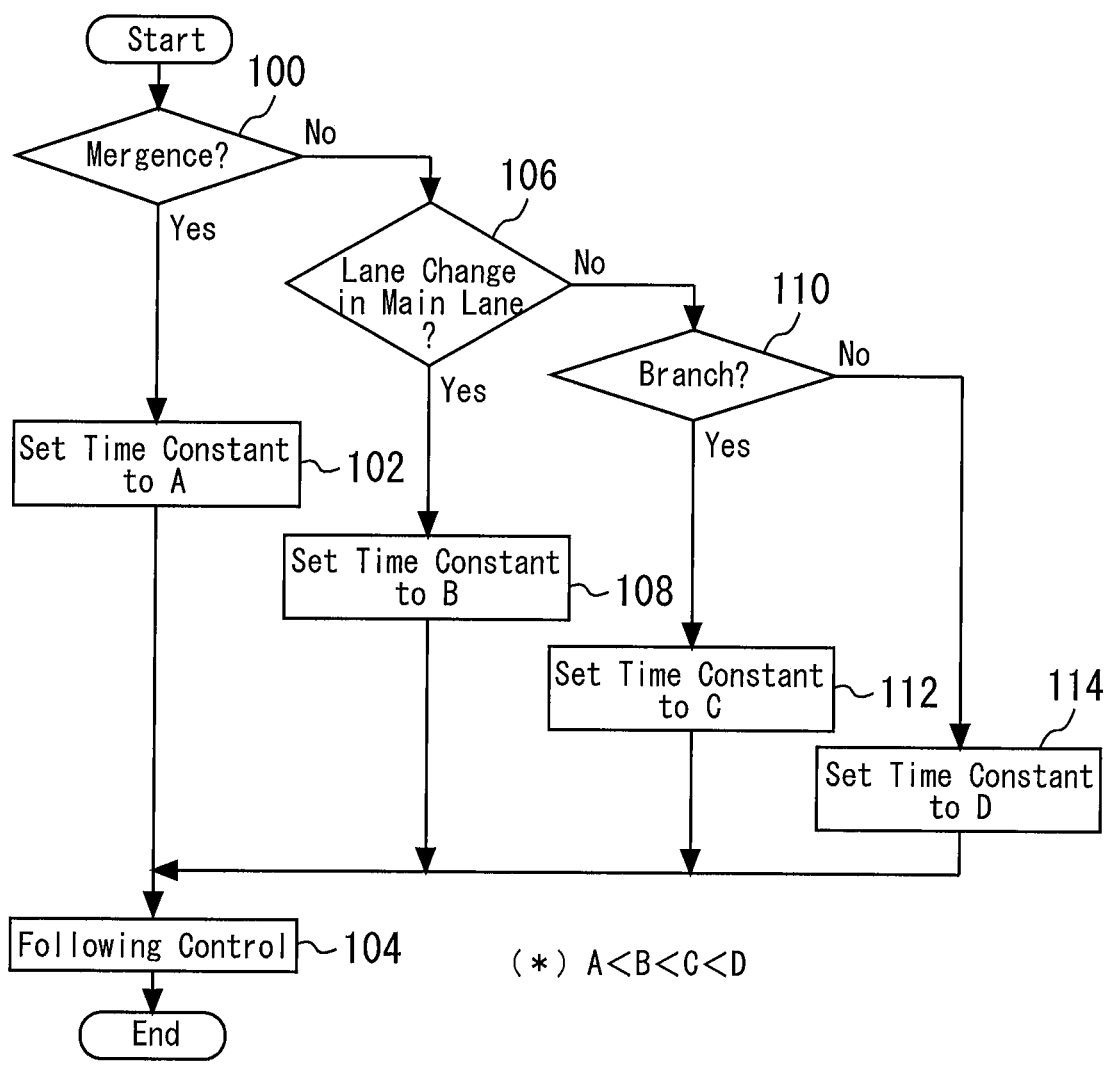
FIG. 7 is a flowchart of a routine executed in double following control by the ECU shown in FIG. 1.

FIG. 7 is a flowchart of a routine that is executed by the ECU 18 to determine the following time constant in accordance with an encounter scene of the vehicle 10. The routine illustrated in FIG. 7 is repeatedly executed at predetermined calculation periods after start of the following control is instructed.

In the routine illustrated in FIG. 7, it is firstly determined whether or not the vehicle 10 encounters the scene of "mergence" (step 100). Here, specifically, processes as follows are sequentially performed.

(100-1) The present location of the vehicle 10 is applied to map data, and it is determined whether or not the vehicle 10 is traveling on a mergence lane. When the present location is not on the mergence lane, the determination in step 100 is negated.

(100-2) When it is determined that the vehicle 10 is traveling on the mergence lane, it is determined whether or not start of autonomous lane change has been instructed. When the instruction is not issued yet, the determination in step 100 is negated. When the instruction has been issued, the determination in step 100 is affirmed.

When the determination of "mergence" is established in step 100, a fixed value "A" prepared with assuming lane change is set to the following time constant (step 102). As described later, in the present embodiment, four kinds of following time constants are set in accordance with the encounter scene of the vehicle 10. Among the four kinds of following time constants, "A" is a smallest value.

When the above described processes are ended, processes of the following control are executed thereafter (step 104), and the routine of the present cycle is ended. The processes of the following control will be described in detail later with reference to FIG. 8.

When the determination of "mergence" is negated in step 100 described above, in the routine illustrated in FIG. 7, it is subsequently determined whether or not the vehicle 10 encounters the scene of "lane change in a main lane" (step 106). Here, specifically, processes as follows are sequentially performed.

(106-1) The present location of the vehicle 10 is applied to the map data, and it is determined whether or not the vehicle 10 is traveling on a main lane. When the present position is not on a main lane, the determination in step 106 is negated.

(106-2) When it is determined that the vehicle 10 is traveling on a main lane, it is determined whether or not start of autonomous lane change has been instructed. When the instruction is not issued yet, the determination in step 106 is negated. When the instruction has been issued, the determination in step 106 is affirmed.

When the determination of "lane change in a main lane" is established in step 106, a fixed value "B" is set to the following time constant (step 108). Among the four kinds of following time constants used in the present embodiment, "B" is the smallest value after "A". After the above described processes are ended, the processes of the following control are executed in step 104 thereafter.

When the determination of "lane change in a main lane" is negated in step 106 described above in the routine illustrated in FIG. 1, it is subsequently determined whether or not the vehicle 10 encounters the scene of "branch" (step 110). Here, specifically, processes as follows are sequentially performed.

(110-1) The present location of the vehicle 10 is recognized on the map data.

(11-0-2) It is determined whether or not the present position of the vehicle 10 belongs to a zone where the vehicle 10 should be moved to a branch lane from a main lane, based on a travel route. When the determination is negated, the determination in step 110 is negated.

(110-3) When the above described determination is affirmed, it is determined whether or not start of autonomous lane change has been instructed. When the instruction is not issued yet, the determination in step 110 is negated. When the instruction has been issued, the determination in step 110 is affirmed.

When the determination of "branch" is established in step 110, a fixed value "C" is set to the following time constant (step 112). Among the four kinds of following time constants used in the present embodiment, "C" is the second largest value. After the above described processes are ended, the processes of the following control are executed in step 104, thereafter.

When the delimitation of "branch" is negated in step 110 described above in the routine illustrated in FIG. 7, it can be determined that lane keep is requested of the vehicle 10. In this case, the largest "D" among the four following time constants is set as the following time constant (step 114). Thereafter, the processes of the following control are executed in step 104.

According to the above processes, "A", "B", "C" and "D" are set as the following time constants respectively for the respective scenes of mergence, lane change in a main lane, branch, and lane keep. Among the values, a relationship as fellows is established. Among the values, a relationship of "A"<"B"<"C"<"D" is established. According to the setting like this, the acceleration and deceleration that occur to the vehicle 10 can be suppressed in order of (i) lane keep, (ii) branch, (iii) lane change in a main lane, and (iv) mergence. That is, the ride comfort of the vehicle 10 can be made favorable in this order. Further, in the reverse order to the above, rapidity until realizing the target following distance can be enhanced. Consequently, according to the present embodiment, the vehicle 10 can properly create preferable conditions desired in the respective encounter scenes.

Figure 8:
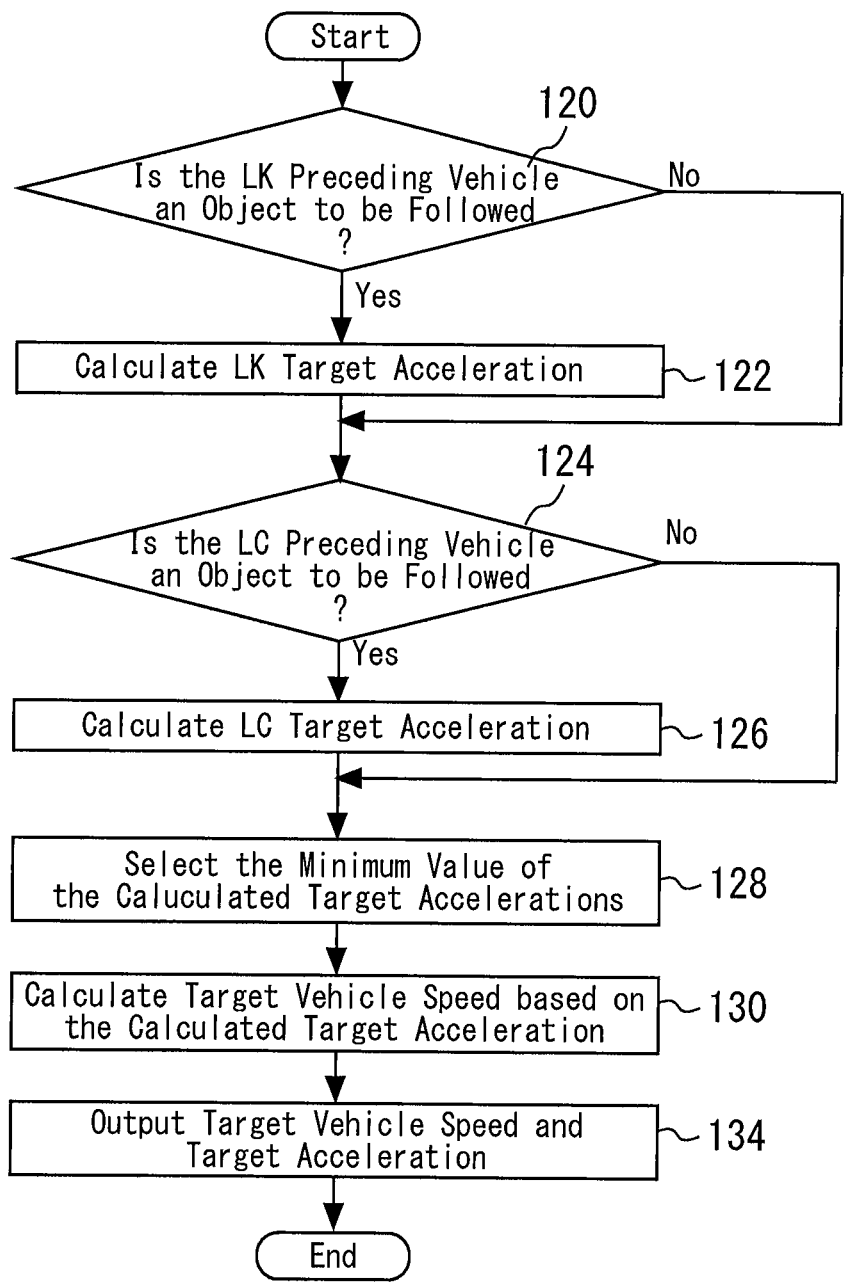
FIG. 8 is a flowchart of a routine, executed, in following control by the ECU shown in FIG. 1.

FIG. 8 illustrates a flowchart of the following control that is executed in step 104 described above (FIG. 7). Here, it is firstly determined whether or not a preceding vehicle on the travel lane is an object to be followed (step 120). That is, it is determined whether it is necessary to capture the LK preceding vehicle, which is travelling on the same lane as that of the vehicle 10, as the object to be followed. In the present embodiment, the LK preceding vehicle is determined as the object to be followed in the following scenes.

1) During lane keep on the main lane (during execution of the LK following control)

2) Period until steering is actually started after instruction to start autonomous lane change is issued (during execution of the double following control)

The double following control is specifically executed in the following three scenes.

2-1) Period until autonomous steering is started after "mergence" is determined 2-2) Period until autonomous steering is started after "lane change in a main lane" is determined 2-3) Period until autonomous steering is started after "branch" is determined In step 120 described above, it is specifically determined whether or not any one of the scenes 1), 2-1), 2-2) and 2-3) described above occurs. When it is determined that, none of the scenes occurs as a result, it is determined that the LK preceding vehicle is not the object to be followed. In this case, step 122 is skipped, and processing in step 124 is executed next.

When it is determined that the LK preceding vehicle is the object to be followed in step 120 described above, the LK target acceleration is calculated by using expressions (1) and (2) described above (step 122). At this stage, the following distance from the LK preceding vehicle is substituted into the "following distance" in expression (1). Further, the LK target following distance which is stored as the target following distance from an LK preceding vehicle is substituted into the "target following distance" in expression (1).

Next, it is determined whether or not the vehicle traveling cm the lane to which the vehicle intends to move, that is, the LC preceding vehicle is an object to be followed (step 124). During the aforementioned double following control, that is, in the scenes of 2-1), 2-2) and 2-3), it is necessary to set the LC preceding, vehicle as the object to be followed in addition to the LK preceding vehicle. Further, in the present embodiment, the LC preceding vehicle is also set as the object to be followed in the following scene.

3) Period until lane change is completed after autonomous steering for lane change is started (during execution of the LC following control)

Thus, in step 124 described above, it is specifically determined whether or not any one of the scenes of 2-1), 2-2), 2-3) and 3) described above occurs. When it is determined that none of the scenes occurs as a result, it is determined that the LC preceding vehicle is not the object to be followed. In this case, step 126 is skipped, and processing in step 128 is executed next.

When it is determined that the LC preceding vehicle is the object to be followed in step 124 described above, the LC target acceleration is calculated by using expressions (1) and (2) described above (step 126). At this time, the following distance from the LC preceding vehicle is substituted into the "following distance" in expression (1). Further, the LC target following distance stored as a target following distance from the LC preceding vehicle is substituted into the "target following distance" in expression (1).

When the above described processing is ended, a minimum value of the calculated target accelerations is selected (step 128). That is, when both of the LK target acceleration and the LC target acceleration are calculated, the smaller one of them is selected as the target acceleration. Further, when only either one of the target accelerations is calculated, a value of the calculated target acceleration is set as the target acceleration.

Next, the target vehicle speed at the time of the present processing cycle is calculated based on the selected target acceleration (step 130). Specifically, the target speed is calculated by substituting the target acceleration selected in step 128 described above into expression (3) described above. Then, the calculated target vehicle speed and the target acceleration is outputted (step 134).

According to the above processing, in the scene of lane keep, only the LK preceding vehicle is set as the target to be followed, and the LK following control is performed. Here, the LK target acceleration is calculated based on the LK following distance and the LK target following distance, and the target speed is further calculated based on a value of the LK target acceleration. In the scene of lane keep, the following time constant is set at the maximum value "D" (refer to step 114 described above). Consequently, stable following control is realized without involving a large acceleration.

In the scene in the period until steering is started alter start of any one of mergence, lane change and branch is determined, both of the LK preceding vehicle and the LC preceding vehicle are set as the objects to be followed, and the double following control is executed. Here, the LK target acceleration based on the LK following distance and the LK target following distance, and the LC target acceleration based on the LC following distance and the LC target following distance are calculated. In calculation of both the target accelerations, "A" is used as the following time constant in the scene of mergence (refer to step 102 described above). Similarly, in both the cases of lane change and branch, "B" or "C" is used as the following time constant (refer to steps 108 and 112 described above). Consequently, according to the double following control, a large value necessary for lane change is allowed with respect to not only the LC target acceleration but also the LK target acceleration. Further, in the double following control, the target vehicle speed is calculated based on smaller one of the LK target acceleration and the LC target acceleration. Consequently, the vehicle 10 does not excessively approach the LK preceding vehicle or the LC preceding vehicle. In this way, according to the aforementioned double following control, it is possible to keep suitable following distances from both the object to be followed on the travel lane and the object to be followed on the target lane while giving quickness that is necessary for lane change to the vehicle 10.

When autonomous steering is started in any one of the scenes of mergence, lane change and branch, only the LC preceding vehicle becomes the object to be followed, and the LC following control is started. Here, the LC target acceleration is calculated based on the LC following distance and the LC target following distance, and the target speed is further calculated based on a value of the LC target acceleration. Here, the following time constants are set at "A", "B" or "C" with respect to each of mergence, lane change and branch. Consequently, a necessary and sufficient acceleration is allowed in each of the scenes. As a result, a favorable ride comfort is obtained, and a high probability of success can be obtained in regard with lane change.

Modification Example of First Embodiment

Incidentally, in the aforementioned embodiment, the final control target in the following control is the vehicle speed, but the embodiment of the present disclosure is not limited to this. That is, the following control in the embodiment of the present disclosure may control an object that resultantly controls the vehicle speed. For example, the final control target may be a driving force or a braking force.

Further, in the aforementioned embodiment, the LK target following distance and the LC target following distance are set at the different values, but the embodiment of the present disclosure is not limited to this. That is, both of the LK target following distance and the LC target following distance may the set at the same value.

Further, in the aforementioned embodiment, the following time constant for calculating the LK target acceleration and the following time constant for calculating the LC target acceleration are made common, but the embodiment of the present disclosure is not limited to this. For example, as the following time constant which is used as the basis of the LK target acceleration in the double following control, the same value "D" as in the case of lane keep may be used.

Further, in the aforementioned embodiment, by changing the following time constant, the magnitude of the acceleration that is allowed to the vehicle 10 is changed in the respective scenes of mergence, lane change in a main lane, branch and lane keep. However, the method for generating the change is not limited to this in the embodiment of the present disclosure. For example, on calculating the target acceleration, a guard value for setting an upper limit or a lower limit thereof may be set, and the guard value may be changed in each of the scenes of mergence, lane change in a main lane, branch and lane keep (corresponding to the above described fourth aspect of the embodiment). Alternatively, on calculating the target acceleration, a guard value for setting an upper limit or a lower limit may be set for jerk, and the guard value may be changed for each of the scenes of merge, lane change in a main lane, branch and lane keep (corresponding to the above described fifth aspect of the embodiment).

Further, in the aforementioned embodiment, the LK following time constant that is used at the time of lane change is set at different values in accordance with the scenes of mergence, lane change in a main lane and branch. However, the embodiment of the present disclosure is not limited to this. That is, for the LK following time constant, a uniform value may be used regardless of the scene.

Further, in the aforementioned embodiment, the target vehicle speed is realized via the driving force instruction value as illustrated in FIG. 3. The target acceleration is included in the inputs for calculating tire driving force instruction value. However, the embodiment of the present disclosure is not limited to this, and the inputs for realizing the target vehicle speed may be simply the vehicle speed and the target vehicle speed.

Correspondence of Terms

In the embodiment described above, the following time constant "D" used in the LK following control, and the following time constants "A", "B" and "C" used in the LC following control are respectively correspond to the "LK following tune constant", and the "LC following time constant" in the above described second aspect of the embodiment. Further, the target vehicle speed calculated in the LK following control and the target vehicle speed calculated in the LC following control respectively correspond to the "LK target vehicle speed" and the "LC target vehicle speed" in the above described second, third, fourth or fifth aspect of the embodiment.

What is claimed is:

1. A control device for vehicle travelling that executes following control that controls a vehicle speed in accordance with a following distance from a preceding vehicle, wherein the following control includes LK following control that is executed so that a following distance from a preceding vehicle on a travel lane becomes an LK target following distance, under a situation of lane keep, and LC following control that is executed so that a following distance from a vehicle to be a preceding vehicle on a target lane becomes an LC target following distance, under a situation of autonomous lane change, in the LC following control, an upper limit of an acceleration or a jerk of the vehicle is set as a first limit that is greater than a second limit of the acceleration or the jerk of the vehicle under the LK following control, and change the upper limit of acceleration of the vehicle from the second limit to the first limit and acceleration under the LC following control is initiated while the vehicle is on the travel lane upon a start of the autonomous lane change being instructed on the travel lane, wherein the first limit is calculated based on a type of a lane change by the vehicle, wherein the type of the lane change includes at least one of merging into a main road, changing lanes in the main road, or branching from the main road, and wherein the upper limit of the acceleration or the jerk of the vehicle when the vehicle merges into the main road is greater than the upper limit of the acceleration or the jerk of the vehicle when the vehicle changes lanes in the main road.

2. The control device for vehicle travelling according to claim 1, wherein the LK following control includes processing of calculating an LK target vehicle speed so that the following distance from the preceding vehicle on the travel lane comes close to the LK target following distance with an LK following time constant, and processing for realizing the LK target vehicle speed, the LC following control includes processing of calculating an LC target vehicle speed so that the following distance from the vehicle to be the preceding vehicle on the target lane comes close to the LC target following distance with an LC following time constant, and processing for realizing the LC target vehicle speed, and the LK following time constant has a larger value than the LC following time constant.

3. The control device for vehicle travelling according to claim 2, wherein the LK following control includes processing of calculating an LK target acceleration based on the LK target following distance, and processing of calculating the LK target vehicle speed based on the LK target acceleration, and the LC following control includes processing of calculating an LC target acceleration based on the LC target following distance, and processing of calculating the LC target vehicle speed based on the LC target acceleration.

4. The control device for vehicle travelling according to claim 1, wherein the upper limit of the acceleration or the jerk of the vehicle when the vehicle changes lanes in the main road is greater than the upper limit of the acceleration or the jerk of the vehicle when the vehicle branches from the main road.

\* \* \* \* \*